(12) United States Patent
Momose

(10) Patent No.: US 11,155,255 B2
(45) Date of Patent: Oct. 26, 2021

(54) TORQUE CONTROLLER AND DRIVE SYSTEM

(71) Applicant: TOYOTA JIDOSHA KABUSHIKI KAISHA, Toyota (JP)

(72) Inventor: Hirofumi Momose, Numazu (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 198 days.

(21) Appl. No.: 16/505,792

(22) Filed: Jul. 9, 2019

(65) Prior Publication Data

US 2020/0039502 A1 Feb. 6, 2020

(30) Foreign Application Priority Data

Aug. 6, 2018 (JP) .............................. JP2018-147924

(51) Int. Cl.
*B60W 20/17* (2016.01)
*B60W 10/08* (2006.01)
(Continued)

(52) U.S. Cl.
CPC ............. *B60W 20/17* (2016.01); *B60W 10/08* (2013.01); *H02P 23/04* (2013.01); *H02P 23/14* (2013.01); *B60W 10/06* (2013.01); *B60W 2510/0657* (2013.01); *B60W 2710/085* (2013.01); *H02P 2205/05* (2013.01)

(58) Field of Classification Search
CPC ............... B60W 20/15; B60W 30/025; B60W 2710/083; B60W 2710/0666; B60W 10/06; B60W 10/08; B60W 30/02; B60W 40/00; B60W 2050/0043; B60W 2050/0014; B60K 6/445; Y02T 10/62; Y02T 10/72

See application file for complete search history.

(56) References Cited

U.S. PATENT DOCUMENTS

2011/0160960 A1* 6/2011 Kajino ................. B60G 17/025
    701/38
2015/0298577 A1* 10/2015 Kobayashi .............. B60L 3/106
    701/22

(Continued)

FOREIGN PATENT DOCUMENTS

JP 2010-125986 A 6/2010
JP 2017-030667 A 2/2017

*Primary Examiner* — Marthe Y Marc-Coleman
(74) *Attorney, Agent, or Firm* — Sughrue Mion, PLLC

(57) ABSTRACT

A drive system includes: a drive device including an electric motor; and a torque controller that controls operations of the electric motor to control torque output from the electric motor. The torque controller includes a target-motor-torque determiner that determines target motor torque based on a sum of motor requested torque and a value obtained by multiplying a gain by sprung-portion-vibration-control torque. The target motor torque is a target value of the torque output from the electric motor. The motor requested torque is determined based on vehicle requested torque requested for driving of the vehicle. The torque controller includes a gain determiner that determines the gain to a value that is less when an absolute value of the motor requested torque is small with respect to the sprung-portion-vibration-control torque than when the absolute value is large with respect to the sprung-portion-vibration-control torque.

9 Claims, 7 Drawing Sheets

(51) Int. Cl.
*H02P 23/04* (2006.01)
*H02P 23/14* (2006.01)
*B60W 10/06* (2006.01)

(56) References Cited

U.S. PATENT DOCUMENTS

2016/0229387 A1* 8/2016 Hata .................... B60W 20/40
2017/0036669 A1   2/2017 Kanou et al.

* cited by examiner

TORQUE CONTROLLER AND DRIVE SYSTEM

CROSS REFERENCE TO RELATED APPLICATION

The present application claims priority from Japanese Patent Application No. 2018-147924, which was filed on Aug. 6, 2018, the disclosure of which is herein incorporated by reference in its entirety.

BACKGROUND

The following disclosure relates to a torque controller configured to control a drive device of a vehicle to control torque and to a drive system including the torque controller.

Patent Document 1 (Japanese Patent Application Publication No. 2017-030667) and Patent Document 2 (Japanese Patent Application Publication No. 2010-125986) disclose torque controllers configured to: control operations of an electric motor of a drive device including an engine and the electric motor and coupled to drive wheels via a transmission mechanism, to control output torque that is torque output from the drive device; and execute sprung-portion-vibration control for suppressing vibrations of a sprung portion of a vehicle. In the sprung-portion-vibration-control torque that is the sum of sprung-portion-vibration-control torque enough to suppress the vibrations of the sprung portion and torque requested by the vehicle is output as the output torque. It is noted that the requested torque is output by the engine, and the sprung-portion-vibration-control torque is output by the electric motor. The sprung-portion-vibration-control torque changes to any of a positive value and a negative value. Thus, the output torque in some cases changes to a positive value and a negative value (noted that this phenomenon may be hereinafter referred to as "zero cross"), leading to a gear rattle noise in the transmission mechanism.

To solve this problem, in the torque controller disclosed in Patent Document 1, the sprung-portion-vibration control is inhibited in the case where an occurrence of the zero cross in the output torque is estimated, and an acceleration request is issued, but in the case where no acceleration request is issued, the requested torque is changed to a value which is less than zero and whose absolute value is larger. This makes it difficult for the zero cross to occur in the output torque, thereby suppressing a gear rattle noise caused due to the sprung-portion-vibration control. In the torque controller disclosed in Patent Document 2, the sprung-portion-vibration control is inhibited in the case where an occurrence of the zero cross in the output torque is estimated, for example, in the case where control for stopping driving of the engine is executed. This suppresses the gear rattle noise caused due to the sprung-portion-vibration control.

SUMMARY

Accordingly, an aspect of the disclosure relates to a technique for increasing the frequency of execution of sprung-portion-vibration control while suppressing a gear rattle noise.

In one aspect of the disclosure, a torque controller controls operations of an electric motor of a drive device of a vehicle including at least the electric motor, to control torque output from the electric motor. In the present torque controller, target motor torque that is a target value of the torque output from the electric motor is determined based on the sum of (i) motor requested torque that is torque requested for the electric motor and (ii) a value obtained by multiplying sprung-portion-vibration-control torque by a gain that is changeable. For example, in the case where the motor requested torque is small with respect to the sprung-portion-vibration-control torque (as one example of a case where an occurrence of a zero cross is estimated), the gain may be a value less than one and greater than zero regardless of the presence or absence of an acceleration request. Accordingly, even in the case where the motor requested torque is small with respect to the sprung-portion-vibration-control torque, and the acceleration request is issued, it is possible to execute the sprung-portion-vibration control while suppressing the gear rattle noise. This increases the frequency of the sprung-portion-vibration control executed by the present torque controller when compared with the torque controllers disclosed in Patent Documents 1, 2.

BRIEF DESCRIPTION OF THE DRAWINGS

The objects, features, advantages, and technical and industrial significance of the present disclosure will be better understood by reading the following detailed description of one embodiment, when considered in connection with the accompanying drawings, in which.

DETAILED DESCRIPTION OF THE EMBODIMENT

Hereinafter, there will be described a drive system including a torque controller according to the present embodiment. In the present embodiment, the torque controller is installed on a hybrid vehicle.

Figure 1:
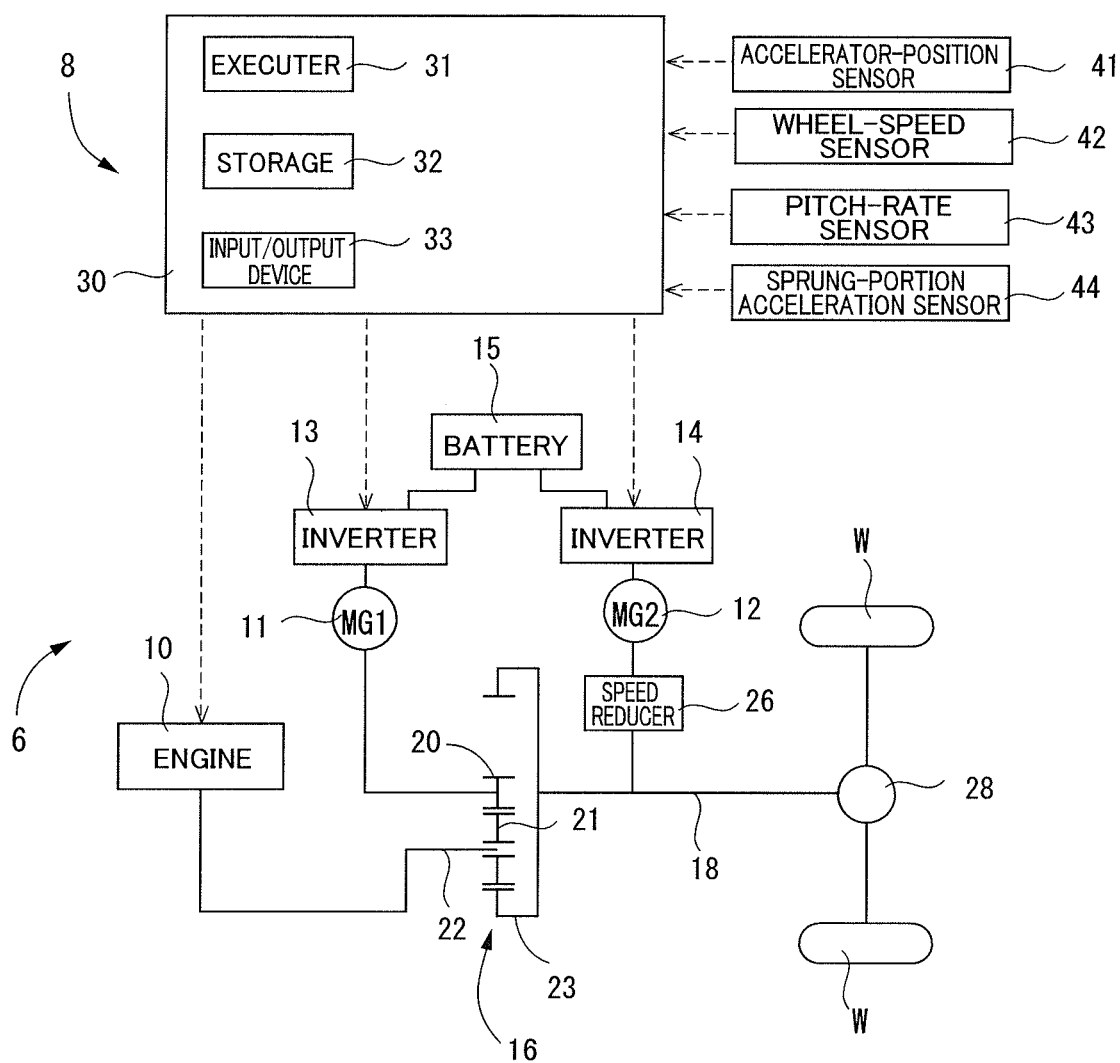
FIG. 1 is a view conceptually illustrating a drive system including a torque controller according to one embodiment.

As illustrated in FIG. 1, the drive system includes a drive device 6 and a torque controller 8. The drive device 6 includes an engine 10, a first motor generator 11, a second motor generator 12, inverters 13, 14, a battery 15, and a power distributing mechanism 16.

The engine 10 is a gasoline engine but may be a diesel engine.

The first motor generator 11 and the second motor generator 12 each as a permanent magnet synchronous motor are connected to the respective inverters 13, 14. In the case where each of the first motor generator 11 and the second motor generator 12 is operated as a motor, a corresponding one of the inverters 13, 14 is controlled to supply electric power from the battery 15 to each of the first motor generator 11 and the second motor generator 12. In this case, direct current is converted to three-phase alternating-current.

Each of the first motor generator 11 and the second motor generator 12 generates electric power in a situation in which a rotation shaft of each of the first motor generator 11 and the second motor generator 12 is rotated by an external force. In the case where each of the first motor generator 11 and the second motor generator 12 is operated as a generator, a corresponding one of the inverters 13, 14 is controlled to charge the battery 15 with electric power output from each of the first motor generator 11 and the second motor generator 12. In this case, three-phase alternating-current is converted to direct current. This electric charge (regeneration of electric power) of the battery 15 applies regenerative braking toque to drive wheels W. It is noted that, even in the case where the second motor generator 12 is operated as a motor or a generator, motor torque which is torque output from the second motor generator 12 is controlled by control for the inverter 14. In the case where the second motor generator 12 is operated as a motor, the motor torque is represented as a positive value. In the case where the second motor generator 12 is operated as a generator, the motor torque is represented as a negative value.

The power distributing mechanism 16 divides driving torque of the engine 10 into power for driving an output shaft 18 of the power distributing mechanism 16 and power for driving the first motor generator 11 as a generator. The power distributing mechanism 16 is a planetary gear mechanism. The planetary gear mechanism includes a sun gear 20, a pinion gear 21, a planetary carrier 22, and a ring gear 23. The engine 10 is connected to the planetary carrier 22 to transmit power to the sun gear 20 and the ring gear 23 via the pinion gear 21. The first motor generator 11 is connected to the sun gear 20. Power transmitted from the sun gear 20 operates the first motor generator 11. The output shaft 18 is connected to the ring gear 23. The second motor generator 12 is connected to the ring gear 23 via a speed reducer 26. The output shaft 18 of the power distributing mechanism 16 is coupled to the left and right drive wheels W via a differential gear 28 and so on. Torque including the driving torque of the engine 10 and the motor torque of the second motor generator 12 is applied to the output shaft 18.

The torque controller 8 includes a hybrid electric control unit (ECU) 30. The hybrid ECU 30 is principally constituted by a computer including: an executer 31 such as a CPU; a storage 32 such as a ROM and a RAM; and an input/output device 33.

Devices connected to the input/output device 33 of the hybrid ECU 30 include: an accelerating-member-position sensor 41 configured to detect an accelerating-member-position that is an amount of operation of an accelerating member, not illustrated, by a driver; wheel-speed sensors 42 configured to respectively detect rotational speeds of four wheels including the left and right drive wheels W; a pitch-rate sensor 43 configured to detect a pitch rate dθp that is an angular speed of pivotal movement of a sprung portion about an axis extending in the right and left direction through the center of gravity of the sprung portion; a sprung-portion acceleration sensor 44 configured to detect an acceleration Gu of the sprung portion in the up and down direction; the engine 10; and the inverters 13, 14. The sprung portion is a portion of the vehicle which is supported by a suspension of the vehicle and includes the vehicle body. A vehicle speed Vs is a speed of the vehicle body which is obtained based on wheel speeds Vw of the respective four wheels which are detected by the respective wheel-speed sensors 42. A displacement z of the sprung portion in the up and down direction is obtained by integrating the detection value of the sprung-portion acceleration sensor 44 twice.

Figure 2:
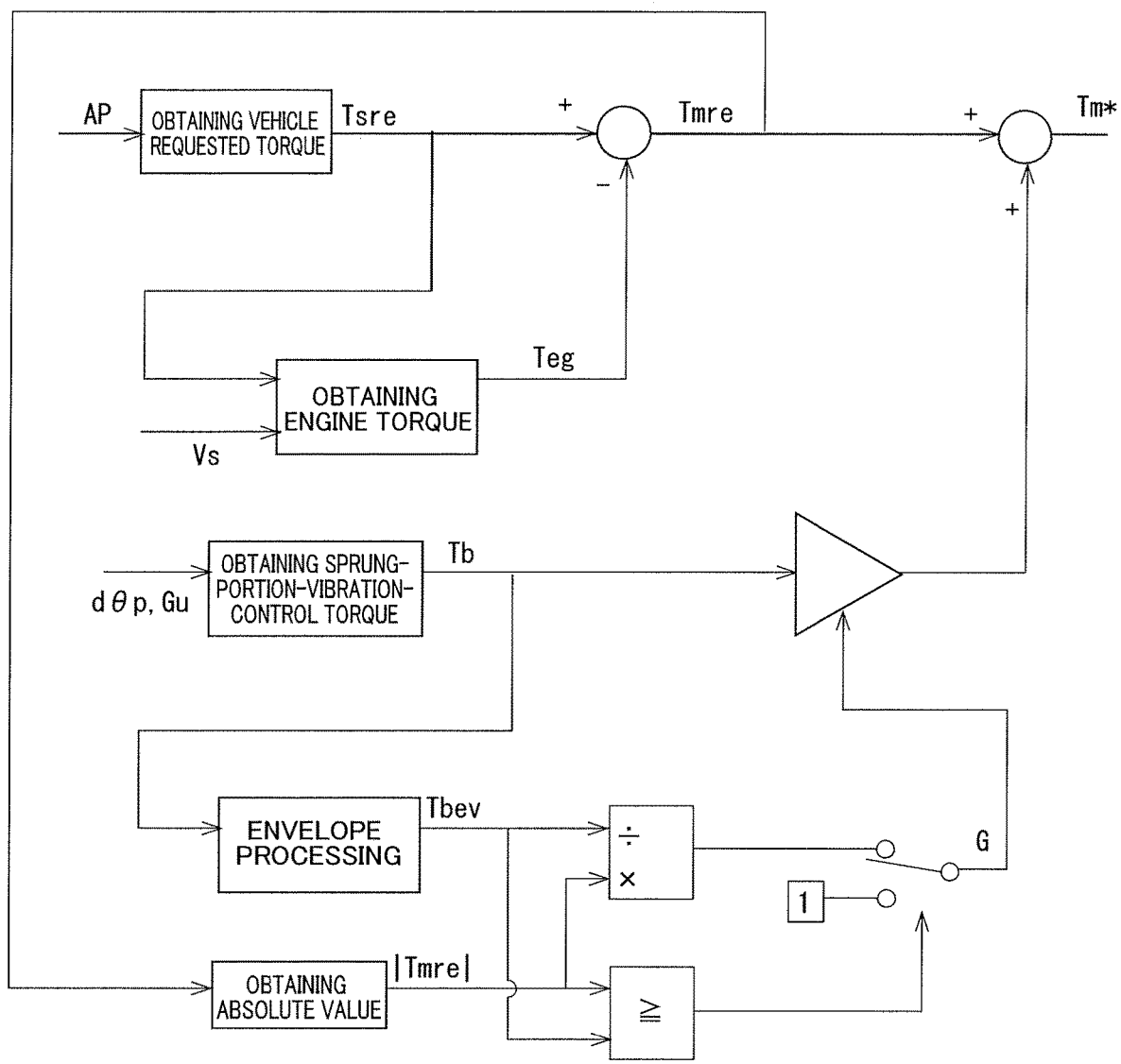
FIG. 2 is a view conceptually illustrating operations of the torque controller.

There will be next described operations of the drive system with reference to FIG. 2. In the present embodiment, controlling the inverter 14 controls operations of the second motor generator 12 as an electric motor to control the motor torque of the second motor generator 12. The hybrid ECU 30 obtains vehicle requested torque Tsre based on an accelerating-member-position AP detected by the accelerating-member-position sensor 41, for example. The vehicle requested torque Tsre is driving torque requested for driving the vehicle. This vehicle requested torque Tsre may be a value that is greater in the case where the amount of operation of the accelerating member is large than in the case where the amount of operation of the accelerating member is small, for example, and the vehicle requested torque Tsre may be referred to as "driver requested torque".

An engine torque Teg is obtained based on the vehicle requested torque Tsre. The engine torque Teg is driving torque output from the engine 10. The engine torque Teg may be determined to an optimum value based on the vehicle speeds Vs obtained based on the detection values of the respective wheel-speed sensors 42, such that an amount of fuel consumption is small, for example. A motor requested torque Tmre is obtained based on a value obtained by subtracting the engine torque Teg from the vehicle requested torque Tsre. The motor requested torque Tmre is torque requested for the second motor generator 12.

Figure 3:
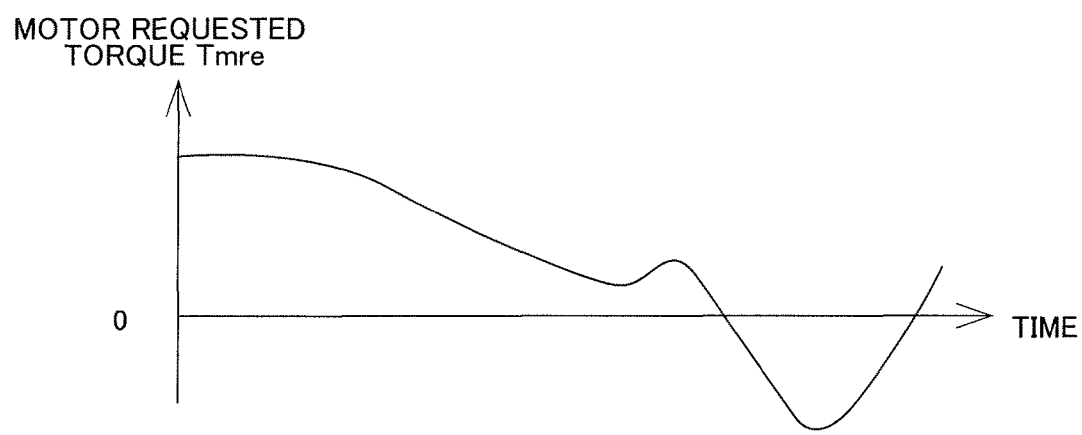
FIG. 3 is a view illustrating motor requested torque requested for a second motor generator of a drive device of the drive system.

The vehicle requested torque Tsre however is in most cases satisfied by the engine torque Teg. During driving in some cases, the engine torque Teg is substantially kept at a certain value, and the second motor generator 12 is operated when the vehicle requested torque Tsre has increased or decreased, in order to improve fuel consumption. Thus, as illustrated in FIG. 3, the motor requested torque Tmre is in most cases determined to zero or a relatively small value around zero.

The torque controller 8 executes sprung-portion-vibration control to suppress vibrations of the sprung portion. An external force has occurred for the wheel during driving of the vehicle due to protrusions and recessions of a road surface, for example, the external force is transmitted to the sprung portion via the suspension. This causes the sprung portion to vibrate around a sprung-portion resonant frequency (for example, 1.5 Hz). The vibrations of the sprung portion contain: a component (heave vibration) in the up and down direction at the center of gravity of the vehicle; and a component (pitch vibration) in the pitch direction about the axis extending in the right and left direction through the center of gravity of the vehicle. In contrast, a portion of torque applied from the drive device 6 to the drive wheels W is converted by the suspension (mainly a linkage mechanism) to a force in the up and down direction of the sprung portion. Accordingly, the drive device 6 can control the torque applied to the drive wheels W, to suppress the vibrations of the sprung portion.

In the sprung-portion-vibration control, the hybrid ECU 30 obtains sprung-portion-vibration-control torque Tb for suppressing the vibrations of the sprung portion. For example, the sprung-portion-vibration-control torque Tb can be obtained using a preconfigured motion model of the vibrations of the sprung portion. The displacement z of the sprung portion in the up and down direction, a displacement θ of the sprung portion in the pitch direction, and rates of change in the displacement z and the displacement θ (the change rates dz/dt, dθ/dt) when the vehicle requested torque Tsre and an estimate value of the torque applied to the drive wheels W are input to the motion model are calculated. An amount of correcting the vehicle requested torque Tsre in the case where each of the obtained displacement z of the sprung portion in the up and down direction, the obtained displacement θ of the vehicle body in the pitch direction, and the obtained change rates dz/dt, dθ/dt converges to zero is obtained. This amount is set to the sprung-portion-vibration-control torque Tb. An explanation of a method of calculating the sprung-portion-vibration-control torque Tb is omitted because the method is not a feature of the present disclosure. The method is disclosed in Japanese Patent Application Publication No. 2010-132254 and Japanese Patent Application Publication No. 2004-168148, for example. A pitch rate dθ/dt that is a change rate of the displacement θ in the pitch direction may be hereinafter referred to as "dθp" (dθ/dt=dθp).

The sprung-portion-vibration-control torque Tb may be obtained as torque that offsets actual upward and downward vibrations of the sprung portion, for example. The upward and downward vibrations of the sprung portion may be represented as the upward and downward acceleration Gu of the sprung portion which is detected by the sprung-portion acceleration sensor 44 or the pitch rate dθp detected by the pitch-rate sensor 43, for example. It is noted that the pitch rate dθp may be obtained based on the detection values of the respective wheel-speed sensors 42.

Figure 4:
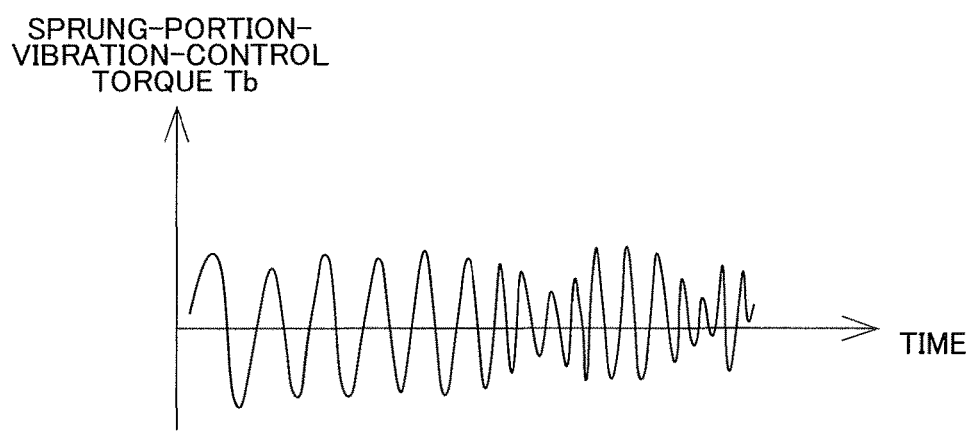
FIG. 4 is a view illustrating sprung-portion-vibration-control torque obtained by the torque controller.

In any case, as illustrated in FIG. 4, the sprung-portion-vibration-control torque Tb may be torque that changes between positive values and negative values across zero, for example. It is noted that the amplitude of the sprung-portion-vibration-control torque Tb may be determined to a value that is greater in the case where an amplitude of the vibrations of the sprung portion is large than in the case where an amplitude of the vibrations of the sprung portion is small.

In the present embodiment, the sprung-portion-vibration-control torque is output by the second motor generator 12. That is, target motor torque Tm* as the target value of the motor torque of the second motor generator 12 is determined to a value obtained by adding the motor requested torque Tmre to a value obtained by multiplying the sprung-portion-vibration-control torque Tb by a gain G (Tm*=Tmre+G× Tb). However, in the case where the target motor torque Tm* of the second motor generator 12 changes between positive values and negative values, in other words, in the case where an occurrence of zero cross of the motor torque is estimated, a gear rattle noise is generated when the backlash mainly in, e.g., the speed reducer 26 is reduced. Thus, it is considered to inhibit the sprung-portion-vibration control in the case where an occurrence of zero cross of the motor torque is estimated.

Incidentally, since upward and downward vibrations of the sprung portion easily occur due to protrusions and recessions of the road surface during driving at a high and constant speed, the sprung-portion-vibration control is preferably executed in this situation. As described above, however, the motor requested torque Tmre is in most cases zero or a value around zero, and thus in the case where the target motor torque is determined to the sum of the motor requested torque Tmre and the sprung-portion-vibration-control torque Tb, the target motor torque in most cases changes between positive values and negative values. Thus, in the case where the sprung-portion-vibration control is inhibited when an occurrence of zero cross of the motor torque is estimated, the sprung-portion-vibration control is inhibited in most of a period in which the vehicle is driven at a high and constant speed, making it difficult to suppress the vibrations of the sprung portion well.

The weight and size of the drive device 6 are reduced with reduction in weight of the vehicle. This may increase a noise generated in the drive device 6. On the other hand, the airtightness of a passenger compartment is increased, resulting in increased demand of quietness in the passenger compartment. Thus, there is a tendency that a range in which an occurrence of the zero cross is estimated is broadened, and the sprung-portion-vibration control is easily inhibited.

In view of the above-described circumstances, the torque controller according to the present embodiment makes the gain G variable to increase a frequency of execution of the sprung-portion-vibration control while suppressing the gear rattle noise. A detailed explanation thereof will be provided below.

Figure 5A:
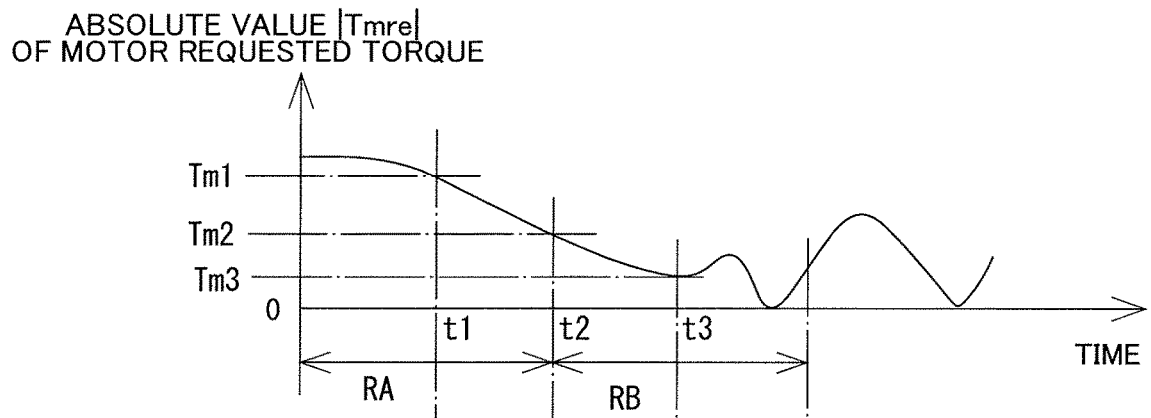
FIG. 5A is a view illustrating an absolute value of the motor requested torque requested for the second motor generator of the drive device.
Figure 5B:
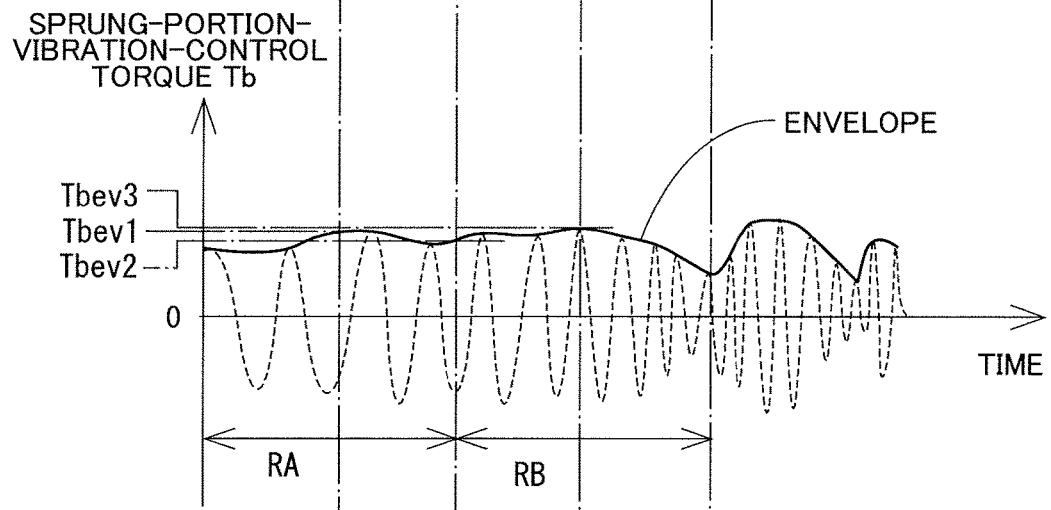
FIG. 5B is a view illustrating an envelope of the sprung-portion-vibration-control torque.

The absolute value |Tmre| of the motor requested torque Tmre is obtained as illustrated in FIG. 5A, and an envelope for the sprung-portion-vibration-control torque Tb is obtained as illustrated in FIG. 5B. The envelope is a curve that shares tangents with a group of curves of the sprung-portion-vibration-control torque Tb (vibrations of the sprung-portion-vibration-control torque Tb). That is, the envelope is a curve that is tangent to the outsides of all the curves of the sprung-portion-vibration-control torque Tb. The envelope for the sprung-portion-vibration-control torque Tb is a line extending through a region near the maximum value of the sprung-portion-vibration-control torque Tb. Thus, obtaining the envelope results in obtainment of the amplitude of the sprung-portion-vibration-control torque or a value approximate to the amplitude.

Figure 5C:
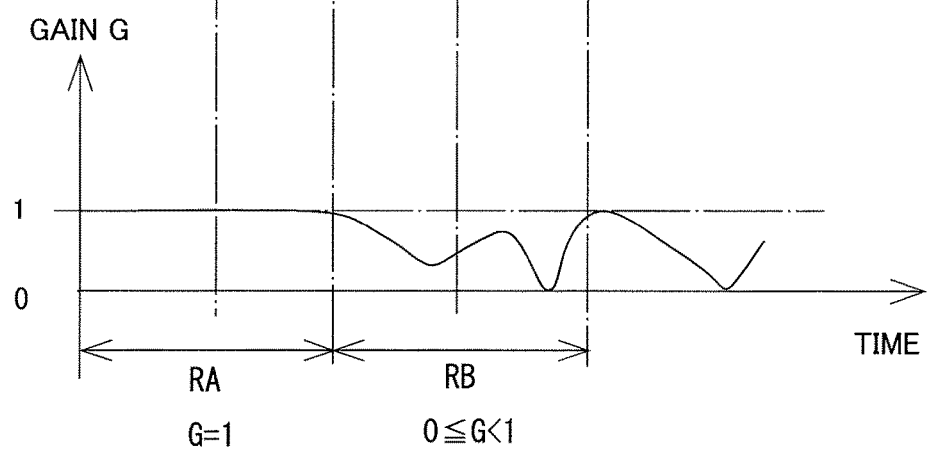
FIG. 5C is a view illustrating a gain.

The absolute value |Tmre| of the motor requested torque and a value Tbev on the envelope corresponding to the motor requested torque Tmre are compared with each other. That is, the absolute value |Tmre| of the motor requested torque and the value Tbev on the envelope at the same time point are compared with each other. For example, the absolute value Tm1 of the motor requested torque is greater than the value Tbev1 on the envelope of the sprung-portion-vibration-control torque Tb at time t1 (Tm1>Tbev1), and the absolute value Tm2 of the motor requested torque is equal to the value Tbev2 on the envelope of the sprung-portion-vibration-control torque Tb at time t2 (Tm2=Tbev2), but in the case where the absolute value |Tmre| of the motor requested torque is greater than or equal to the value Tbev on the envelope as in the period RA in FIG. 5, it is considered that it is difficult for the zero cross to occur even in the case where the sprung-portion-vibration-control torque Tb is added to the motor requested torque Tmre. Thus, in the case where the absolute value |Tmre| of the motor requested torque is greater than the value Tbev on the envelope of the sprung-portion-vibration-control torque Tb, as illustrated in FIG. 5C, the gain is determined to one.

In contrast, for example, the absolute value Tm3 of the motor requested torque is less than the value Tbev3 on the envelope of the sprung-portion-vibration-control torque Tb at time t3 (Tm3<Tbev3). In the case where the absolute value |Tmre| of the motor requested torque is less than the value Tbev on the envelope as in the period RB in FIG. 5, an occurrence of the zero cross is estimated. Thus, in the case where the absolute value |Tmre| of the motor requested torque is less than the value Tbev on the envelope of the sprung-portion-vibration-control torque, the gain is determined to a value less than one. Specifically, in the period RB in FIG. 5, a ratio γ obtained by dividing the absolute value |Tmre| of the motor requested torque by the value Tbev on the envelope is obtained and determined as the gain ($\gamma$=|Tmre|/Tbev, G=$\gamma$). In the case where the absolute value |Tmre| of the motor requested torque is zero, the ratio $\gamma$ is zero, and the gain G is determined to zero. In the case where the absolute value |Tmre| of the motor requested torque is greater than zero, the gain G is determined to a value less than one and greater than zero.

Figure 6:
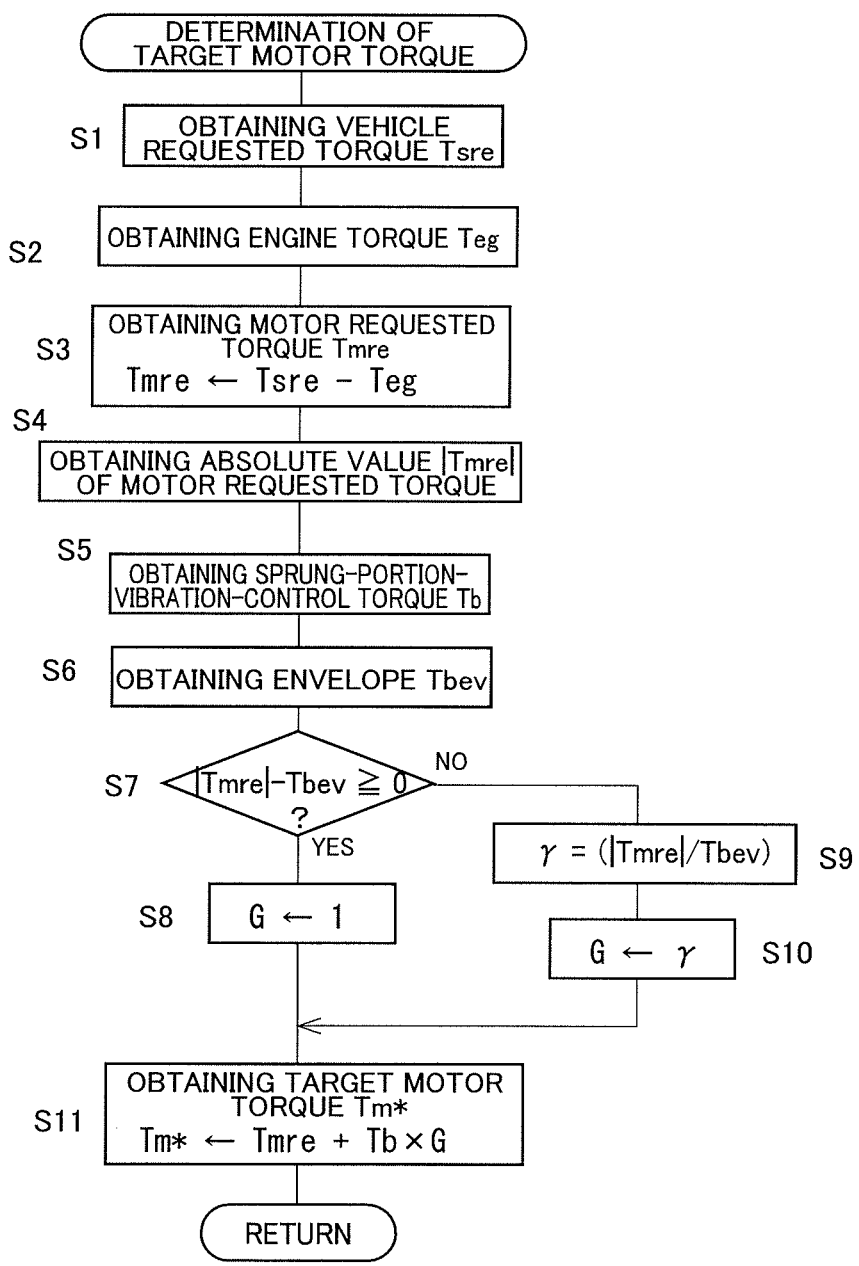
FIG. 6 is a flowchart representing a target-motor-torque determining program stored in a storage of the torque controller.

The operations described above are represented by the flowchart in FIG. 6. A target-motor-torque determining program represented by the flowchart in FIG. 6 is executed each time when a set length of time is elapsed. The vehicle requested torque Tsre is obtained at S1. The engine torque Teg is obtained at S2. The motor requested torque Tmre is obtained at S3. The absolute value |Tmre| of the motor requested torque is obtained at S4. The sprung-portion-vibration-control torque Tb is obtained at S5. The envelope is obtained at S6.

At S7, it is determined whether the absolute value |Tmre| of the motor requested torque is greater than or equal to the value Tbev on the envelope of the sprung-portion-vibration-control torque. In other words, it is determined whether a value obtained by subtracting the value Tbev on the envelope of the sprung-portion-vibration-control torque from the absolute value |Tmre| of the motor requested torque is greater than or equal to zero. When a positive decision (YES) is made at S7, the gain G is determined to one at S8. When a negative decision (NO) is made at S7, the ratio $\gamma$ is obtained and determined as the gain at S9 and S10. At S11, the target motor torque Tm* is obtained as a value obtained by adding the motor requested torque Tmre to a value obtained by multiplying the sprung-portion-vibration-control torque Tb by the gain G obtained at S8 or S10. The inverter 14 is controlled so as to bring the motor torque of the second motor generator 12 closer to the target motor torque Tm*.

Figure 7:
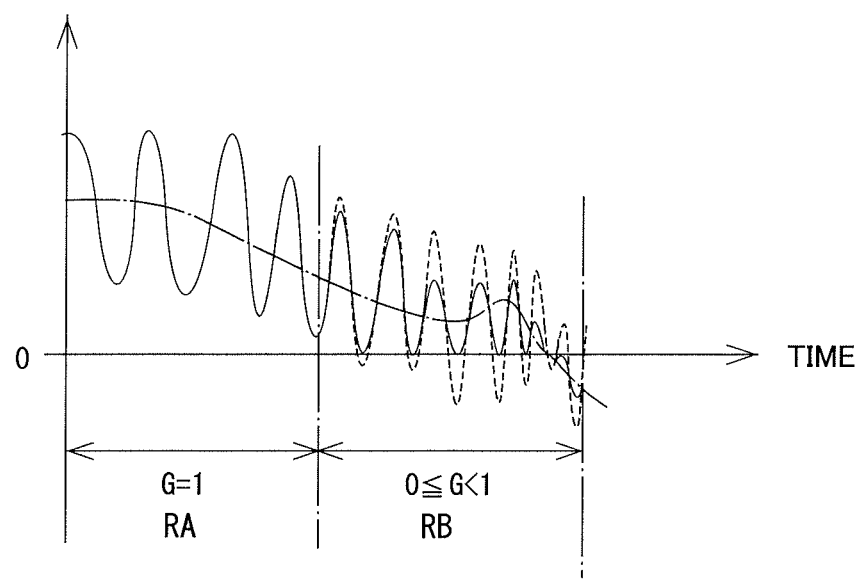
FIG. 7 is a view illustrating the target motor torque.

FIG. 7 illustrates one example of changes of the target motor torque Tm*. The absolute value |Tmre| of the motor requested torque is greater than or equal to the value Tbev on the envelope of the sprung-portion-vibration-control torque Tb in the period RA, and thus the gain G is determined to one. The target motor torque Tm* changes as indicated by the solid line. In the period RB, in contrast, the absolute value |Tmre| of the motor requested torque is less than the value Tbev on the envelope of the sprung-portion-vibration-control torque Tb, and thus the gain G is determined to a value less than one. Accordingly, as indicated by the broken line, in the case where the gain G is one, even when the zero cross of the target motor torque Tm* occurs, an occurrence of the zero cross is made difficult as indicated by the solid line by setting the gain G to a value less than one.

In the present embodiment as described above, in the case where the absolute value |Tmre| of the motor requested torque is less than the value Tbev on the envelope of the sprung-portion-vibration-control torque Tb, the gain G is determined to a value less than one. Thus, even in the case where the absolute value |Tmre| of the motor requested torque is less than the value Tbev on the envelope of the sprung-portion-vibration-control torque Tb, it is possible to execute the sprung-portion-vibration control while suppressing the gear rattle noise, resulting in increase in the frequency of the sprung-portion-vibration control.

In the present embodiment, it is possible to consider that the amplitude of the sprung-portion-vibration-control torque Tb is less in the case where the absolute value |Tmre| of the motor requested torque is small than in the case where the absolute value |Tmre| of the motor requested torque is large. The amplitude of the sprung-portion-vibration-control torque Tb is an amplitude capable of suppressing the vibrations of the sprung portion, that is, the amplitude of the sprung-portion-vibration-control torque Tb is a sprung-portion-vibration suppressing amplitude that is an amplitude determined based on, e.g., the pitch rate d$\theta$p and the upward and downward acceleration Gu of the sprung portion. This sprung-portion-vibration suppressing amplitude is corrected to be smaller. Thus, in the case where the gain G is fixed to one, even when the sprung-portion-vibration control is inhibited to suppress the gear rattle noise, the amplitude can be corrected to a small value to execute the spring vibration control while suppressing the gear rattle noise.

Also in the present embodiment, in the case where the absolute value |Tmre| of the motor requested torque is less than an inhibition threshold value, the sprung-portion-vibration control may be inhibited. However, since the gain G is variable and determined to a value less than one, the sprung-portion-vibration control is more frequently executed while suppressing the gear rattle noise. This configuration makes it possible to set the inhibition threshold value to a small value when compared with a case where the gain G is fixed to one.

The gain G is determined based on a difference between the absolute value |Tmre| of the motor requested torque and the value Tbev on the envelope of the sprung-portion-vibration-control torque Tb, and the sprung-portion-vibration control is executed. Thus, in the case where the value Tbev on the envelope of the sprung-portion-vibration-control torque Tb is small even when the absolute value |Tmre| of the motor requested torque is small, the gain is set to one or a value close to one, and in the case where the value Tbev on the envelope of the sprung-portion-vibration-control torque is large even when the absolute value |Tmre| of the motor requested torque is large, the gain is set to a value less than one. Accordingly, in the case where the absolute value |Tmre| of the motor requested torque is less than the inhibition threshold value, it is possible to increase the frequency of execution of the sprung-portion-vibration control while further suppressing the gear rattle noise when compared with the sprung-portion-vibration control is always inhibited.

As illustrated in FIG. 5B, the value Tbev on the envelope of the sprung-portion-vibration-control torque Tb and the amplitude of the sprung-portion-vibration-control torque Tb are not always equal to each other. In the case where the value of the target motor torque Tm* is determined to a value close to zero due to control error, for example, the gear rattle noise may be generated. To solve this problem, a margin may be provided to make it difficult for the absolute value of the target motor torque Tm* to become less than the margin. For example, the drive system may be configured such that, in the case where a value obtained by subtracting the value Tbev on the envelope from the absolute value |Tmre| of the motor requested torque is greater than or equal to a set value $\alpha$ representing the margin (|Tmre|−Tbev≥$\alpha$), the gain is determined to one, and in the case where the value obtained by subtracting the value Tbev on the envelope from the absolute value |Tmre| of the motor requested torque is less than the set value $\alpha$, the gain G is determined to a value $\gamma$x obtained by subtracting, from the ratio $\gamma$, a value obtained by dividing the set value $\alpha$ by the value Tbev on the envelope [G=$\gamma$x=(|Tmre|/Tbev)−($\alpha$/Tbev)=(|Tmre|−$\alpha$)/Tbev].

Figure 8:
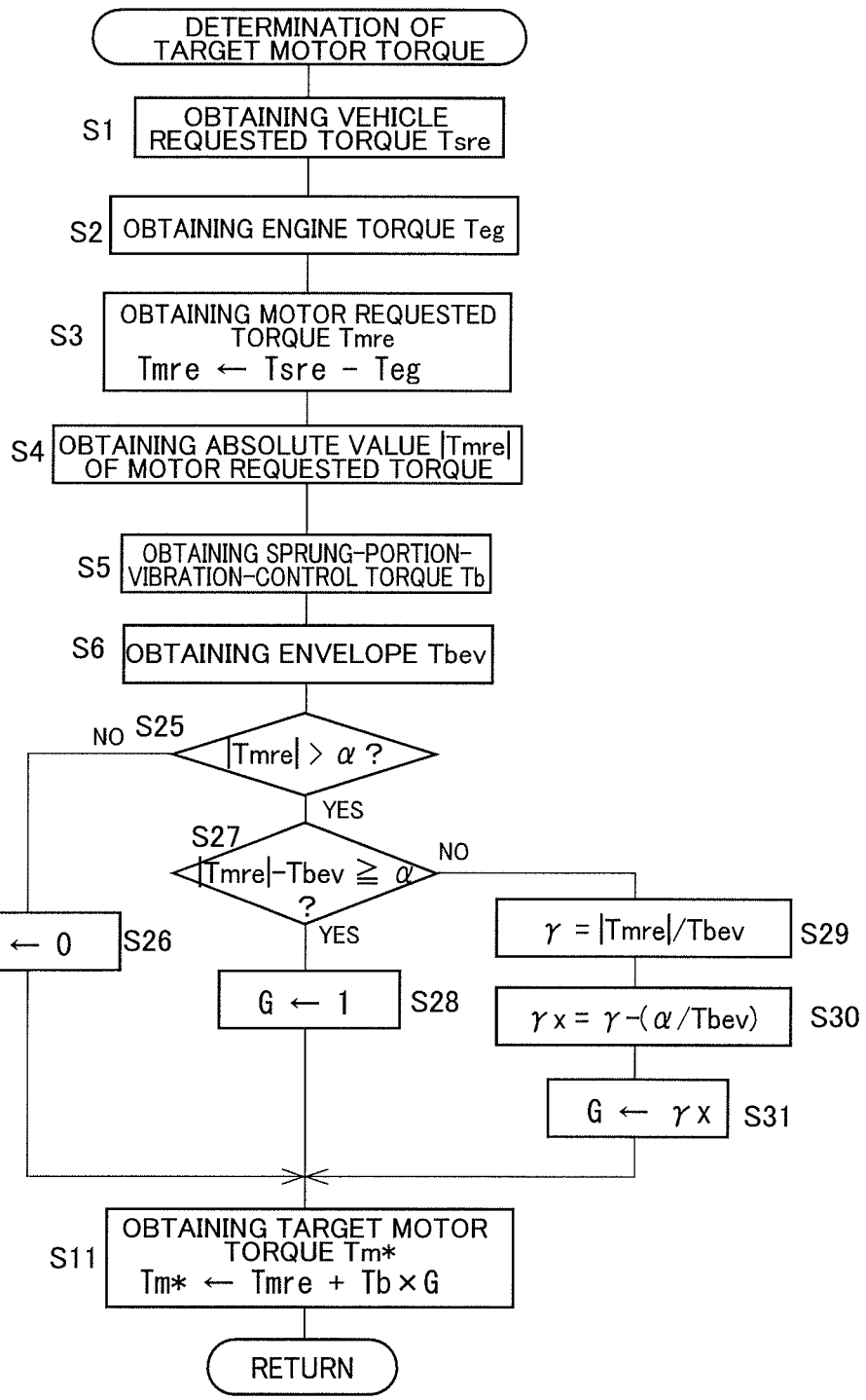
FIG. 8 is a flowchart representing another target-motor-torque determining program stored in the storage of the torque controller.

FIG. 8 is a flowchart representing one example of a target-motor-torque determining program in this case. It is noted that the same step numbers as used in the flowchart in FIG. 6 are used to designate the corresponding step numbers in the flowchart in FIG. 8, and an explanation of which is dispensed with. After the absolute value |Tmre| of the motor requested torque and the envelope of the sprung-portion-vibration-control torque are obtained, it is determined at S25 whether the absolute value |Tmre| of the motor requested torque is greater than the set value α. When a negative decision (NO) is made at S25, the gain G is determined to zero at S26. The processings at S25 and S26 are executed to prevent determination of the gain G to a negative value. It is also possible to consider that the set value α is a sprung-portion-vibration-control inhibiting threshold value.

When a positive decision (YES) is made at S25, it is determined at S27 whether the value obtained by subtracting the value Tbev on the envelope of the sprung-portion-vibration-control torque from the absolute value |Tmre| of the motor requested torque is greater than or equal to the set value α. When a positive decision (YES) is made at S27, the gain is determined to one at S28. When a negative decision (NO) is made at S27, the value γx obtained by dividing, by the value Tbev on the envelope, a value obtained by subtracting the set value α from the absolute value |Tmre| of the motor requested torque is obtained at S29 and S30. The value γx is determined to the gain G at S31. In other words, the ratio γ is obtained at S29, and the value γx obtained by subtracting, from the ratio γ, a value obtained by dividing the set value α by the value on the envelope is obtained at S30.

Thus, in the present embodiment, the margin is provided, making it possible to further suppress the gear rattle noise.

In the present embodiment, as described above, a target-motor-torque determiner is constituted by portions of the hybrid ECU 30 which store and execute the flowcharts in FIGS. 6 and 8, for example. A gain determiner is constituted by portions of the target-motor-torque determiner which store and execute the processings at S7-S10 and S25-S31, for example. A motor-requested-torque determiner is constituted by portions of the hybrid ECU 30 which store and execute the processings at S1-S3, for example. A sprung-portion-vibration-control-torque determiner is constituted by portions of the hybrid ECU 30 which store and execute the processing at S5, for example. An envelope obtainer is constituted by portions of the hybrid ECU 30 which store and execute the processing at S6, for example. A ratio obtainer is constituted by portions of the hybrid ECU 30 which store and execute the processings at S9 and S29, for example.

It is noted that, at S25 in the above-described embodiment, a value greater than the set value α may be determined as a sprung-portion-vibration-control inhibiting threshold value, and it may be determined whether the absolute value |Tmre| of the motor requested torque is less than the sprung-portion-vibration-control inhibiting threshold value. The sprung-portion-vibration-control inhibiting threshold value in this case may be set to a small value when compared with the sprung-portion-vibration-control inhibiting threshold value set in a case where the gain G is always set to one.

The gain G is determined based on the value obtained by subtracting the value Tbev on the envelope of the sprung-portion-vibration-control torque Tb from the absolute value |Tmre| of the motor requested torque in the above-described embodiment but may be determined based on a ratio that is a value obtained by dividing the absolute value |Tmre| of the motor requested torque by the value Tbev on the envelope of the sprung-portion-vibration-control torque Tb. For example, the drive system may be configured such that, in the case where the ratio is greater than or equal to a set ratio, the gain G is determined to one, and in the case where the ratio is less than the set ratio, the gain G may be determined to a value that is determined to the ratio. It is noted that the set ratio may be one or a value greater than one.

The torque controller is installed on the hybrid vehicle in the above-described embodiment but may be mounted on other vehicles such as an electric vehicle and a fuel-cell vehicle. In the case where the drive device includes no engine, the vehicle requested torque is equal to the motor requested torque determined for the electric motor.

While the embodiment and modifications have been described above, it is to be understood that the disclosure is not limited to the details of the illustrated embodiment and modifications, but may be embodied with various changes and modifications, which may occur to those skilled in the art, without departing from the spirit and scope of the disclosure.

CLAIMABLE INVENTIONS (1) A torque controller configured to control operations of an electric motor of a drive device of a vehicle comprising at least the electric motor, to control torque output from the electric motor, the torque controller comprising:

a target-motor-torque determiner configured to determine (set) target motor torque based on a sum of motor requested torque and a value obtained by multiplying a gain by sprung-portion-vibration-control torque for suppressing vibrations of a sprung portion of the vehicle, the target motor torque being a target value of the torque output from the electric motor, the motor requested torque being determined based on vehicle requested torque that is torque requested for driving of the vehicle; and a gain determiner configured to determine (set) the gain to a value that is less when an absolute value of the motor requested torque is small with respect to the sprung-portion-vibration-control torque than when the absolute value of the motor requested torque is large with respect to the sprung-portion-vibration-control torque.

The motor requested torque may be a value equal to the vehicle requested torque or a value less than the vehicle requested torque, for example. For example, in the case where the drive device includes an engine in addition to the electric motor, the motor requested torque may be a value obtained by subtracting engine torque, which is torque output from the engine, from the vehicle requested torque. The target motor torque may be the sum of the motor requested torque and a value obtained by multiplying the sprung-portion-vibration-control torque by the gain and may be a value less than the sum (e.g., a value obtained by multiplying the sum by a coefficient less than one). Whether the absolute value of the motor requested torque is small with respect to the sprung-portion-vibration-control torque may be determined based on a difference between the absolute value of the motor requested torque and the amplitude of the sprung-portion-vibration-control torque or a value approximate to the amplitude or based on a ratio of the absolute value of the motor requested torque to the amplitude of the sprung-portion-vibration-control torque or the value approximate to the amplitude, for example.

(2) The torque controller according to the above form (1), wherein the gain determiner is configured to determine the gain that is less when a value obtained by subtracting a value on an envelope obtained for the sprung-portion-vibration-control torque, from the absolute value of the motor requested torque is small than when the obtained value is large.

The envelope of the sprung-portion-vibration-control torque is approximate to a line connecting the amplitudes of the sprung-portion-vibration-control torque to each other. A zero cross occurs more easily when a value obtained by subtracting the value on the envelope of the sprung-portion-vibration-control torque from the absolute value of the motor requested torque at the same time point is small than when the obtained value is large. Thus, the gain is preferably determined to a value that is less when the obtained value is small than when the obtained value is large.

(3) The torque controller according to the above form (1) or (2), wherein the gain determiner is configured to:

determine the gain to one when a value obtained by subtracting a value on an envelope obtained for the sprung-portion-vibration-control torque from the absolute value of the motor requested torque is greater than or equal to a set value; and when the obtained value is less than the set value, determine the gain to a value less than one, based on a ratio that is a value obtained by dividing the absolute value of the motor requested torque by the value on the envelope obtained for the sprung-portion-vibration-control torque.

The set value may be zero or a value greater than zero. Determining the set value to a value greater than zero further reduces the zero cross. The gain may be a value that is less when the ratio is small than when the ratio is large. The gain may be a value equal to the ratio or a value less than the ratio.

(4) The torque controller according to the above form (3), wherein the gain determiner is configured to, when the obtained value is less than the set value, determine the gain to a value obtained by subtracting, from the ratio, a value obtained by dividing the set value by the value on the envelope obtained for the sprung-portion-vibration-control torque.

For example, the torque controller may be configured such that, when the set value α is zero, the gain G is determined to a ratio γ (=|Tmrel|/Tbev) (G=γ), and when the set value α is greater than zero, the gain G is determined to a value obtained by subtracting, from the ratio γ, a value (α/Tbev) obtained by dividing the set value α by the value Tbev on the envelope of the sprung-portion-vibration-control torque [G=(|Tmrel|/Tbev)−(α/Tbev)=(|Tmrel|−α)/Tbev].

(5) The torque controller according to any one of the above forms (1) through (4), wherein the gain determiner is configured to determine the gain to zero when the absolute value of the motor requested torque is less than a sprung-portion-vibration-control inhibiting threshold value.

The sprung-portion-vibration-control inhibiting threshold value is in most cases set to such a value that an occurrence of the zero cross is estimated. In the torque controller according to the present form, in contrast, the gain is determined to a small value when the absolute value of the motor requested torque is small with respect to the sprung-portion-vibration-control torque, making it possible to determine the sprung-portion-vibration-control inhibiting threshold value to a small value. The sprung-portion-vibration-control inhibiting threshold value may be the set value described in the form (3) or (4), for example.

(6) The torque controller according to any one of the above forms (1) through (5), wherein the drive device comprises the electric motor and an engine, and wherein the torque controller comprises a motor-requested-torque determiner configured to determine the motor requested torque based on a value obtained by subtracting engine torque from the vehicle requested torque, and the engine torque is driving torque output by the engine.

In the case where the torque controller according to the present form is employed to a torque controller configured to control the drive device of the hybrid vehicle, the motor requested torque is a value obtained based on a value obtained by subtracting the engine torque from the vehicle requested torque. Thus, the motor requested torque is in most cases set to a small value.

(7) The torque controller according to any one of the above forms (1), (5), and (6), wherein the gain determiner is configured to:

determine the gain to one when a ratio that is a value obtained by dividing the absolute value of the motor requested torque by a value on an envelope of the sprung-portion-vibration-control torque is greater than or equal to a set ratio; and determine the gain to a value less than one based on the ratio when the ratio obtained by the ratio obtainer is less than the set ratio.

(8) A torque controller configured to control operations of an electric motor of a drive device of a vehicle comprising at least the electric motor, to control torque output from the electric motor, the torque controller comprising a target-motor-torque determiner configured to determine target motor torque based on a sum of motor requested torque and sprung-portion-vibration-control torque for suppressing vibrations of a sprung portion of the vehicle, the target motor torque being a target value of the torque output from the electric motor, the motor requested torque being determined based on vehicle requested torque that is torque requested for driving of the vehicle, wherein the target-motor-torque determiner is configured to determine the target motor torque by making an amplitude of the sprung-portion-vibration-control torque smaller when the absolute value of the motor requested torque is small with respect to the sprung-portion-vibration-control torque than when the absolute value of the motor requested torque is large with respect to the sprung-portion-vibration-control torque.

The technical features of the torque controller according to any one of the above forms (1) through (7) may be incorporated into the torque controller according to the present form.

(9) A torque controller configured to control operations of an electric motor of a drive device of a vehicle comprising at least the electric motor, to control motor torque output from the electric motor, the torque controller comprising: a target-motor-torque determiner configured to;

determine target motor torque based on a sum of motor requested torque and a value obtained by multiplying a gain by sprung-portion-vibration-control torque for suppressing vibrations of a sprung portion of the vehicle, the target motor torque being a target value of the motor torque, the motor requested torque being determined based on a value obtained by subtracting driving torque output by an engine from vehicle requested torque that is torque requested for driving of the vehicle; and determine the motor requested torque to the target motor torque when an absolute value of the motor requested torque is less than a sprung-portion-vibration-control inhibiting threshold value.

In a hybrid vehicle, it is possible to: obtain the motor requested torque as the value obtained by subtracting the engine torque from the vehicle requested torque; and inhibit the sprung-portion-vibration control when the absolute value of the motor requested torque is less than the inhibition threshold value. It is noted that the gain may be a fixed value or a variable value. The technical features of the torque controller according to any one of the above forms (1) through (8) may be incorporated into the torque controller according to the present form.

(10) A drive system, comprising:
a drive device provided in a vehicle and comprising at least an electric motor; and
a torque controller configured to control operations of the electric motor to control torque output from the electric motor,
wherein the torque controller comprises:
a target-motor-torque determiner configured to determine target motor torque based on a sum of motor requested torque and a value obtained by multiplying a gain by sprung-portion-vibration-control torque for suppressing vibrations of a sprung portion of the vehicle, the target motor torque being a target value of the torque output from the electric motor, the motor requested torque being determined based on vehicle requested torque that is torque requested for driving of the vehicle; and
a gain determiner configured to determine the gain to a value that is less when an absolute value of the motor requested torque is small with respect to the sprung-portion-vibration-control torque than when the absolute value of the motor requested torque is large with respect to the sprung-portion-vibration-control torque.

The technical features of the torque controller according to any one of the above forms (1) through (9) may be incorporated into the drive system according to this form.

What is claimed is:

1. A drive system, comprising:
a drive device provided in a vehicle and comprising at least an electric motor; and
a torque controller configured to control operations of the electric motor to control torque output from the electric motor,
wherein the torque controller comprises a hybrid electronic control unit (ECU) programmed to:
determine target motor torque based on a sum of motor requested torque and a value obtained by multiplying a gain by sprung-portion-vibration-control torque for suppressing vibrations of a sprung portion of the vehicle, the target motor torque being a target value of the torque output from the electric motor, the motor requested torque being determined based on vehicle requested torque that is torque requested for driving of the vehicle; and
determine the gain to a value that is less when an absolute value of the motor requested torque is small with respect to the sprung-portion-vibration-control torque than when the absolute value of the motor requested torque is large with respect to the sprung-portion-vibration-control torque.

2. The drive system according to claim 1,
wherein the hybrid ECU is further programmed to:
determine the motor requested torque based on the vehicle requested torque; and
determine the sprung-portion-vibration-control torque based on displacement of the sprung portion of the vehicle in an up and down direction, and
determine the target motor torque based on the sum of (i) the value obtained by multiplying the gain by the sprung-portion-vibration-control torque and (ii) the motor requested torque.

3. The drive system according to claim 1, wherein the hybrid ECU is further programmed to:
determine the gain to one when a value obtained by subtracting a value on an envelope obtained for the sprung-portion-vibration-control torque from the absolute value of the motor requested torque is greater than or equal to a set value; and
when the obtained value is less than the set value, determine the gain to a value less than one, based on a ratio that is a value obtained by dividing the absolute value of the motor requested torque by the value on the envelope obtained for the sprung-portion-vibration-control torque.

4. The drive system according to claim 3, wherein the hybrid ECU is further programmed to obtain, as the ratio, the value obtained by dividing the absolute value of the motor requested torque by the value on the envelope obtained for the sprung-portion-vibration-control torque.

5. The drive system according to claim 4, wherein the hybrid ECU is further programmed to, when the obtained value is less than the set value, determine the gain to a value obtained by subtracting, from the ratio obtained by the ratio obtainer, a value obtained by dividing the set value by the value on the envelope obtained for the sprung-portion-vibration-control torque.

6. The drive system according to claim 4, wherein the hybrid ECU is further programmed to:
determine the gain to one when the ratio is greater than or equal to a set ratio; and
determine the gain to a value less than one based on the ratio when the ratio is less than the set ratio.

7. The drive system according to claim 3, wherein the hybrid ECU is further programmed obtain an envelope for the sprung-portion-vibration-control torque.

8. The drive system according to claim 1,
wherein the drive device comprises the electric motor and an engine, and
wherein the hybrid ECU is further programmed to determine the motor requested torque based on a value obtained by subtracting engine torque from the vehicle requested torque, and the engine torque is driving torque output by the engine.

9. A torque controller configured to control operations of an electric motor of a drive device of a vehicle comprising at least the electric motor, to control torque output from the electric motor, the torque controller comprising:
a hybrid electronic control unit (ECU) programmed to:
determine target motor torque based on a sum of motor requested torque and a value obtained by multiplying a gain by sprung-portion-vibration-control torque for suppressing vibrations of a sprung portion of the vehicle, the target motor torque being a target value of the torque output from the electric motor, the motor requested torque being determined based on vehicle requested torque that is torque requested for driving of the vehicle; and
determine the gain to a value that is less when an absolute value of the motor requested torque is small with respect to an amplitude of the sprung-portion-vibration-control torque than when the absolute value of the motor requested torque is large with respect to the amplitude of the sprung-portion-vibration-control torque.

* * * * *